(12) United States Patent
Demes

(10) Patent No.: US 7,323,429 B2
(45) Date of Patent: Jan. 29, 2008

(54) CLAY COMPOSITION

(75) Inventor: Hagen Demes, Obertshausen (DE)

(73) Assignee: Dow Corning Limited, Barry, Wales (GB)

( * ) Notice: Subject to any disclaimer, the term of this patent is extended or adjusted under 35 U.S.C. 154(b) by 673 days.

(21) Appl. No.: 10/433,494

(22) PCT Filed: Dec. 5, 2001

(86) PCT No.: PCT/EP01/14702

§ 371 (c)(1),
(2), (4) Date: May 30, 2003

(87) PCT Pub. No.: WO02/46119

PCT Pub. Date: Jun. 13, 2002

(65) Prior Publication Data

US 2004/0029713 A1    Feb. 12, 2004

(30) Foreign Application Priority Data

Dec. 7, 2000 (GB) .................... 0029774.7

(51) Int. Cl.
*C04B 33/04* (2006.01)
*C04B 33/132* (2006.01)

(52) U.S. Cl. ............. 501/155; 501/141; 501/144; 501/146

(58) Field of Classification Search .......... 501/155, 501/141–148
See application file for complete search history.

(56) References Cited

U.S. PATENT DOCUMENTS 4,130,439 A * 12/1978 Gashenko et al. ........ 588/256
4,408,030 A * 10/1983 Marko ..................... 528/10
4,646,661 A *  3/1987 Roos et al. ............... 110/245
4,690,810 A *  9/1987 Breneman et al. ......... 588/316
5,350,549 A *  9/1994 Boyle ..................... 264/40.4
5,876,609 A *  3/1999 White et al. .............. 210/725
6,342,461 B1 *  1/2002 Lee et al. ................. 501/141
6,905,996 B2 *  6/2005 Fackler et al. ............ 501/155

FOREIGN PATENT DOCUMENTS

| DE | 3713482 | 11/1988 |
| DE | 4333235 | 4/1995 |
| DE | 19929568 | 9/2000 |
| EP | 314971 | 5/1989 |
| EP | 603691 | 6/1994 |

OTHER PUBLICATIONS

Articvle: "Espindesa Direct Process for Obtaining Concentrated Weak Nitric Acid", Nitrogen No. 184, Mar. 1990 British Sulphur Co., London.

* cited by examiner

*Primary Examiner*—Karl E Group
(74) *Attorney, Agent, or Firm*—Howard & Howard Attorneys, P.C.

(57) ABSTRACT

A method for pacifying the spent bed material resulting from the synthesis of organohalosilanes and halosilanes by mixing clay with spent bed material. Clay compositions containing at least 10 weight % of clay and spent bed material, as well as ceramic compositions containing spent bed material, are also provided.

17 Claims, No Drawings

CLAY COMPOSITION

The present invention relates to methods for pacifying the spent bed material resulting from the synthesis of organohalosilanes and halosilanes, compositions containing the spent bed material and uses of the spent bed material.

BACKGROUND AND PRIOR ART

Organohalosilanes, halosilanes, and in particular methylchlorosilanes, are the building blocks from which silicone polymers are produced. Organohalosilanes and halosilanes are commercially produced by what is commonly called "the direct process", in which silicon metal is reacted with an organic halide or hydrogen chloride, optionally in the presence of a catalyst. The direct process is well known in the art, and is well described in patent literature.

In, for example, the commercial production of methylchlorosilanes by the direct process, finely ground silicon metal powder is reacted with methyl chloride in the presence of a catalyst by fluidising the silicon powder in a fluid bed by passing methyl chloride gas there through at a temperature of between 200° C. and 500° C. At the end of the reaction, there remains in the fluid bed spent bed material. Similar steps are taken and similar spent bed material is produced when manufacturing halosilanes.

In the commercial production of methylchlorosilanes, after the removal of the methylchlorosilanes from the fluid bed reactor, the spent bed material remaining in the fluid bed reactor comprises mainly silicon metal and silicon oxides, with minor amounts of other materials such as catalyst (if used), unreacted organic halide, carbon residues, impurities and reaction product.

It is well known that spent bed material can be hazardous if left in an unpacified state. When in contact with moisture, such as atmospheric moisture, it evolves hydrogen gas, and it is highly susceptible to atmospheric oxidation, i.e. it is self-heating, and represents a potential fire hazard. Consequently, spent bed material is commonly pacified through quenching by reaction with an alkaline substance, for example an aqueous lime solution, with heating.

A typical quenching method is described in EP 428,337 (Dow Corning) in which spent bed material is heated in an aqueous basic solution with stirring, and then separated from the heated aqueous basic solution by filtration, pressed into cakes, and aged to reduce any residual chemical activity. Such quenching processes are however time consuming, the basic solution typically contacting the spent bed material for 6 to 12 hours whilst it neutralises and converts metallic silicon to silica. After neutralisation, the solid bed material has to separated by filtration and the aqueous filtrate invariably contains some metals, which have come from the spent bed. These have to be removed by water treatment steps before the filtrate can be discharged into the environment. After filtration, a substantial amount of water remains with the solid spent bed material, which adds considerably to the weight of material which has to be transported. Thus, quenching methods tend to be economically expensive.

Russian Patent No. 2118561 (State Scientific Centre of the Russian Federation) describes a method for granulating hard waste resulting from the synthesis of organochlorosilanes. Hard waste is granulated into hard granules (e.g. about 5-40 mm in size) by mixing with an aqueous agent comprising from 5 to 40 weight % of alkaline agent selected from sodium hydroxide, sodium silicate, calcium hydroxide and mixtures thereof. Granulation is carried out in a suitable granulator such as a rotary drum granulator and the resulting granules are calcined. The passivated granulated material is described as being useful for repeated use of copper and silicon in copper metallurgy, for restorative smelting of silicon and for metallurgic processes as the source of ferrosilicon, copper etc.

In order to aid granulation, connective substances such as bentonite, lime, opoka, dolomite fluor, clay or mixtures thereof can be added to the mixture being granulated. In example 5, bentonite, and in example 7, clay, are added to the granulator in maximum amount of 8.8 and 8.1 weight %, respectively, of the total material added to the granulator. Even if all the water is removed during drying and calcination, the maximum bentonite and clay contents in the product of examples 5 and 7 is 9.7 and 8.9 weight %, respectively.

The process described in RU 2118561 is still time consuming and expensive. It still involves the use of an aqueous basic solution and results in much of the silicon metal being converted into silica. Furthermore, it necessitates that the granules be calcined.

The present inventors have found an economically advantageous way to pacify spent bed material, which method also provides an industrially useful end product. They have found that mixing spent bed material with clay pacifies the spent bed material and that the resulting clay composition is non-self heating and evolves substantially reduced amounts of hydrogen gas compared to spent bed material alone. The method is relatively quick with the processing time from fresh feeds to a pacified product typically being less than 10 minutes. Furthermore, the method does not require the use of an aqueous basic solution and the water content of the pacified material is low which reduces transport costs and processing costs for end uses. Unlike prior art processes, in the process of the present invention, all or most of the silicon metal content of the spent bed is preserved, the properties of which can be utilised. In addition, it is not necessary to calcinate the pacified material of the present invention.

SUMMARY OF THE INVENTION

According to a first aspect of the invention there is provided a clay composition comprising spent bed material and at least 10 weight % of clay.

According to a second aspect of the invention there is provided a ceramic composition comprising spent bed material.

According to a third aspect of the invention there is provided a method of pacifying spent bed material comprising mixing spent bed material directly with clay.

According to a fourth aspect of the invention there is provided a method for making a ceramic comprising forming a pre-ceramic article which comprises spent bed material, and baking the article at an elevated temperature.

DETAILED DESCRIPTION OF THE INVENTION

Definitions

As used herein, "spent bed material" refers to the residual material in a fluid bed resulting from the reaction of silicon metal with an organic halide or hydrogen chloride in a fluid bed in the manufacture of organohalosilanes and/or halosilanes in the direct process reaction.

As used herein, "clay" is given its dictionary definition, i.e. it refers to various forms of hydrated alumino silicate, e.g. those hydrated alumino silicates of general formula $Al_2O_3.SiO_2.xH_2O$, where x is the degree of hydration.

As used herein, "ceramic" is given is dictionary definition, i.e. a hard, brittle product manufactured by the action of heat (e.g. firing) on earthy raw materials, in which silicon and its oxide and silicates occupy a predominant position.

Clay Compositions

The clay compositions of the present invention comprise spent bed material and at least 10 weight % of clay.

Commonly known examples of clays include Fuller's Earth, bentonite, kaolin (China clay) and diatomite. A preferred clay for use in the present invention is bentonite.

The level of clay in the clay composition can vary depending on the activity of the unpacified spent bed material and the type of clay in question. Suitably, the clay composition comprises at least 10 weight %, more preferably at least 15 weight % and more preferably at least 20 weight % of clay. Suitably, the clay composition comprises from 10 to 90 weight %, preferably from 15 to 70 weight %, more preferably from 15 to 60 weight % and yet more preferably from 20 to 60 weight % of clay.

As mentioned above, spent bed material comprises silicon metal and silicon oxides with minor amounts of other materials such as catalyst (if used), unreacted organic halide, carbon residues, impurities and reaction product. Typical spent bed material may thus comprise approximately 50% silicon metal and silicon oxides, and minor amounts of copper catalyst (if used), iron, carbon, aluminium chloride, methyl chloride, and chlorosilanes and/or polysilanes.

Suitably, the amount of spent bed material in the clay composition ranges from 10 to 90 weight %, preferably from 20 to 80 weight % and more preferably from 30 to 70 weight % of the clay composition.

Suitably, the weight ratio of clay to spent bed material in the clay composition ranges from 10:1 to 1:10, preferably from 5:1 to 1:5, more preferably from 3:1 to 1:3. A particularly useful range has been found to be from 2:1 to 1:2, for example 1:1.

The clay and spent bed material suitably account for at least 50 weight %, more preferably at least 60 weight %, and yet more preferably at least 70 weight % of the clay composition. The clay composition may contain other components, such as for example water. In a preferred embodiment, the clay composition contains water at a level of from 10 to 40 weight %, preferably from 15 to 30 weight % and more preferably from 20 to 25 weight % of the clay composition. The water can be incorporated either by separate addition and/or by having some or all of the clay in a slurry form rather than in a "dry" form.

The amount of clay required to pacify the spent bed will vary depending on the type and nature of the clay. One way of considering a bed to be pacified is when it achieves a non-self heating status. A spent bed is considered to be non-self heating within the context of the present invention when it satisfies the provisions laid down by the European ADR Division 4.2 test for dangerous goods ("Recommendations on the Transport of Dangerous Goods, Manual of Tests and Criteria", (1995), United Nations, New York and Geneva, ISBN92-1-139049-4). Briefly, a 4-inch cube of the spent bed and clay mixture is baked to 140° C. for 24 hours. It the rise in temperature of the cube is less than 60° C. above the baking temperature, i.e. it stays below 200° C., it is considered non-self heating.

It is highly preferred that the clay is used to pacify "unpacified" spent bed material. In the context of the present invention, "unpacified" means that the spent bed material is substantially untreated. In particular, the spent bed has not been treated (quenched) with any aqueous alkaline agent.

Ceramic Compositions

The spent bed material can be incorporated into a wide variety of ceramics. However, particularly useful ceramics to which the methods of the present invention can be applied include for example structural clay products (bricks, tiles, terra cotta, architectural bricks), whitewares (dinnerware, chemical and electrical porcelain), porcelain enamels and refractories (materials that withstand high temperatures). Even more particularly, ceramics such as roofing panels, masonry bricks, cladding bricks, pavers, wafer bricks, boardings and ducts can benefit from the methods of the present invention.

Ceramics made from a pre-ceramic mixture comprising spent bed material can show advantageous properties over ceramics not containing spent bed material. Such ceramics can have increased compression strength, lower water absorption and lower levels of efflorescence. For examples, bricks made from a pre-ceramic mixture comprising spent bed material can demonstrate all these advantages. It is highly preferred that the ceramic compositions comprise clay. The use of spent bed material has been found to be particularly advantageous in such clay-based ceramics. A preferred pre-ceramic mixture therefore comprises clay and spent bed material.

Low levels of efflorescence and leachability are important properties for ceramics to possess. Efflorescence is the powdery substance formed as a result of a material efflorescing, i.e. becoming encrusted with a powder or crystals as a result of chemical change or the evaporation of a solution. The mechanisms of efflorescence are often complicated. However, one of the major causes appears to be water-soluble salts in solution being brought to the surface of a ceramic and deposited there by evaporation.

In bricks, efflorescence is the white crystalline deposit of water-soluble salts which can sometimes be seen on the brick surface. The salts typically become water-insoluble at the surface through reaction with carbon dioxide and therefore are not washed off for example by rain water. This is highly unsightly and can be a particular problem in cladding bricks which are exposed to the weather. Also, certain vanadium and molybdenum compounds present in some ceramic units may produce a green deposit, commonly referred to a s "green stain". Occasionally, "brown stain" may occur, resulting from deposits of manganese compounds. We have found that the presence of spent bed material, even at relatively low levels, for example less than 3 weight % of the pre-ceramic mixture, can reduce the levels of efflorescence and leaching. This is highly advantageous for any ceramic in terms of regulatory and environmental provisions and is particularly advantageous for bricks, especially cladding bricks.

Efflorescence may be measured as follows: A portion, for example a third of the volume, of a ceramic article is submerged in distilled water for one week. The article is then dried at room temperature and its surface checked for efflorescence by looking for the level of surface area covered by salt deposits, typically white spots in most cases.

The compression strength of ceramics made according to the invention may be measured by DIN 105.

However, spent bed material is a hazardous material to handle, and hence a preferred additive in the preparation of ceramics is a clay/spent bed material mixture, i.e. the clay composition of the present invention. A preferred clay composition for use as an additive in the preparation of a ceramic comprises a clay/spent bed material mixture in a weight ratio of from 3:1 to 1:3 and more preferably from 2:1 to 1:2, a 1:1 ratio being particularly preferred.

Thus, the clay composition of the present invention not only provides an economically advantageous method of pacifying spent bed material, but is also useful as an additive in the preparation of ceramics.

The amount of spent bed material added to the pre-ceramic mixture (which is to be heated to form the ceramic) is suitably from 0.5 to 10 weight %, preferably from 1 to 4 weight % and more preferably from 1 to 2.5 weight % of the pre-ceramic mixture. The amount of spent bed material present in the ceramic is suitably from 0.2 to 10 weight %, preferably from 1 to 4 weight % and more preferably from 1 to 2 weight % of the pre-ceramic mixture.

Further additives may be incorporated in the ceramic compositions to impart further advantageous properties to the ceramic. Additive(s) can be incorporated either by mixing the additive(s) into the clay composition containing the spent bed material which is added to the pre-ceramic mixture or alternatively by adding additive(s) directly to the pre-ceramic mixture and separately from the clay composition containing the spent bed material.

A preferred additive is direct process residue gel, derived from a further material produced by the direct process, i.e. direct process residue (DPR). DPR comprises the higher boiling point halosilanes produced by the direct process. The DPR is neutralised, for example, with lime solution, to reduce its activity, and dewatered, resulting in a gel-solids mixture, which is DPR gel. Methods for neutralising DPR materials are well known in the art, see for example U.S. Pat. No. 4,408,030 (Dow Corning), U.S. Pat. No. 4,690,810 (Union Carbide) and U.S. Pat. No. 5,876,609 (General Electric). In a preferred embodiment, the DPR is premixed with the clay composition comprising spent bed material prior to being incorporated into the pre-ceramic mixture.

Other useful additives that can be incorporated into the pre-ceramic mixture vary depending on the nature of the ceramic material being produced. For example, sintering agents can be incorporated into the pre-ceramic mixture in for example the manufacture of bricks. Useful sintering agents include boric acid, which may suitably be present in an amount of up to 1.0 weight %, preferably up to 0.5 weight % of the pre-ceramic mixture, and sodium borate. Another useful additive is barium carbonate, which can further lower the amount of efflorescence.

Method of Pacifying Spent Bed Material

The present invention also provides a method of pacifying spent bed material comprising mixing the spent bed material with clay.

It is highly preferred that the spent bed material is unpacified when mixed with the clay, i.e. it has not even been partially treated e.g. with a quenching agent.

The clay and spent bed material are simply mixed together using any suitable mixing equipment, for example a static mixer, a pan mill or a finger mixer pug mill.

Suitably, the spent bed material and clay are mixed with water. The amount of water added is suitably such that it accounts for from 10 to 40 weight %, preferably from 15 to 30 weight % and more preferably from 20 to 25 weight % of the total composition.

In a preferred embodiment, an extruder is used to mix the clay composition. When using an extruder it is crucial that the clay composition contain water, suitably in the amounts given above. Preferably, when using an extruder, the spent bed material and clay are pre-mixed and at least some water, and preferably a substantial amount of the final water in the clay composition, is added and mixed into the pre-mix prior to the clay composition being introduced into the extruder. The water can be introduced separately and/or via the use of a clay slurry. When using an extruder to mix the clay compositions of the present invention, a water content of from 20 to 25 weight %, especially from 22 to 25 weight %, has been found to be particularly suitable.

The advantage of an extrusion process is that the final clay composition product can be obtained in the form of billets or pieces, which are easy and convenient to handle and store. The additives may be supplied to the process using any suitable equipment such as, for example, screw feeders, weigh belt feeders and vibratory feeders. The additives may be incorporated into the extruded billets or pieces by feeding the additives upstream of the extrusion process, or they may be combined with the billets after the extruder as suits the specific application.

Method of Making a Ceramic

The present invention also provides a method for making a ceramic which method comprises forming a pre-ceramic article which comprises spent bed material, and baking the article at elevated temperature.

Suitably, the spent bed material is incorporated as a mixture of spent bed material and clay, in which the clay was used to pacify the spent bed material as described above.

The pre-ceramic mixture can be prepared using any suitable equipment such as, for example, pan mills, pug mills and finger mills.

The baking temperature required to convert the pre-ceramic article into the ceramic will vary according to the particular pre-ceramic in question, and the type of ceramic being made. Typical baking temperatures are between 850° C. and 1300° C. For the manufacture of ceramics such as roofing panels, masonry bricks, cladding bricks, pavers, wafer bricks etc. containing spent bed material, these typically require a thermal processing temperature of at least 850° C., e.g. ranging from 850 to 1100°

Importantly, the spent bed material can be incorporated into ceramic compositions without requiring significant process modifications or adding any significant production costs to existing ceramic manufacturing processes.

The present invention will now be further described by way of the following examples.

EXAMPLES

Example 1

Pacification of Spent Bed Material

Two batches of a clay/spent bed material mixture were prepared as follows. For Batch 1, 35 weight % of ball clay and 65 weight % of spent bed material, and for Batch 2, 25 weight % of ball clay and 75 weight % of spent bed material, were weighed into a closed mixing chamber (a polypropylene drum with mixing shaft) and dry-mixed for approximately 3 minutes. The ball clay used was ground and dry, i.e. no more than 2 weight % of water (ex WBB & Co plc, Devon, UK). Water was then added in an amount of 25 weight % of the total mixture, and the mixture mixed for a further 5 minutes. All mixing was performed under nitrogen. The resulting mixtures, which were powder-like but not dusty, were removed from the closed mixing chamber and mixed a further three times by passing through a twin-screw extruder, followed by a pug mill and finally another extruder. The resulting extrudates were cut into appropriate sample sizes.

One hundred gram samples of Batches 1 and 2 were then tested over time for hydrogen gas generation (gas samples were taken using a gas-tight syringe and injected into a gas chromatograph for analysis). The results are given in Tables 1 and 2 below.

In addition, a 500 g sample of Batch 1 was tested over time for any rise in temperature, due to self heating of the spent bed material, using two temperature probes. By way of comparison, room temperature was also measured. The results are shown in Table 3 below.

TABLE 1

Hydrogen production from Batch 1

| Time (mins) | $H_2(g)$ generated (ml) | $H_2(g)$ generated (ml/kg-hour) |
|---|---|---|
| 0 | 0.0 | 0.0 |
| 265 | 12.0 | 27.1 |
| 335 | 16.2 | 29.0 |
| 405 | 18.9 | 28.0 |
| 1165 | 44.5 | 22.9 |
| 1485 | 52.6 | 21.2 |
| 1715 | 56.9 | 19.9 |
| 2570 | 61.8 | 14.4 |
| 2990 | 65.7 | 13.2 |
| 4115 | 69.4 | 10.1 |

TABLE 2

Hydrogen production from Batch 2

| Time (min) | $H_2(g)$ generated (ml) | $H_2(g)$ generated (ml/kg-hour) |
|---|---|---|
| 0 | 0.0 | 0.0 |
| 190 | 8.7 | 27.6 |
| 210 | 14.5 | 41.4 |
| 300 | 18.9 | 37.8 |
| 370 | 23.4 | 38. |
| 1250 | 65.1 | 31.2 |
| 1585 | 86.9 | 32.9 |
| 1800 | 88.8 | 29.6 |
| 2680 | 98.5 | 22.1 |
| 3145 | 107.9 | 20.6 |
| 4240 | 114.6 | 16.2 |

TABLE 3

Self-heating of Batch 1

| Time (min) | Probe 1 (° C.) | Probe 2 (° C.) | Room (° C.) |
|---|---|---|---|
| 0 | 25.4 | 26.5 | 25.3 |
| 30 | 26.0 | 26.8 | 25.7 |
| 60 | 26.4 | 27.2 | 26.2 |
| 90 | 26.9 | 27.5 | 26.3 |
| 120 | 27.1 | 27.3 | 26.5 |
| 150 | 27.5 | 27.9 | 26.5 |
| 180 | 27.9 | 28.1 | 27.0 |
| 210 | 28.1 | 28.4 | 26.8 |
| 240 | 28.5 | 28.7 | 27.2 |
| 270 | 28.6 | 29.1 | 28.3 |
| 300 | 28.8 | 29.1 | 28.3 |

Example 2

Non-Self Heating Tests

Untreated spent bed material was placed in a 2×2 inch cube and heated to 140° C. in an oven. After about an hour the spent bed reached about 850° C. This material would fail the United Nations ADR Division 4.2 self-heating test because the exotherm exceeded 60° C. above the baking temperature and it is known generally that materials which fail the test in a 2×2 inch cube will also fail the test in the 4×4 inch cube called for in ADR 4.2. The 2×2 inch cube was used in this test for safety considerations.

Untreated spent bed material was mixed with "Champion" ball clay supplied by H. C. Spinks Clay Company, Inc. of Paris Tenn., USA. The mixture contained 80 g spent bed material, 144 g clay and 56 g water. The mixture was placed in a 4×4 inch cube, placed in an oven and heated to 140° C. The material reached a peak temperature of about 175° C. after about 8 hours. The material temperature then decreased to the 140° C. oven temperature and remained stable for the reminder of the test. This demonstrated that the material was non-self heating under United Nations ADR Division 4.2 self-heating test.

Example 3

Compression Strength of a Ceramic

Batch 3 of ceramic test samples was prepared from ball clay (ex WBB & Co plc, Devon, UK) by adding 2 weight % of a 1:1 weight ratio mixture of bentonite/spent bed material (prepared using the procedure described in Example 1) to the clay, mixing and baking at a temperature of 930° C. for a maximum of 60 minutes.

The above test sample preparation was then repeated to prepare Batch 4 of ceramic test samples with the above additive being replaced by 2 weight % of a 1:1:0.3 weight ratio mixture of bentonite/spent bed material/DPR gel.

A comparative Batch A of test samples containing no additive was prepared with baking at 970° C. for a maximum of 60 minutes.

The compression strength was tested by placing the samples under a press and applying a measured pressure until the test sample cracked. The results are given in Table 4.

TABLE 4

Compression strength data from Batches A, 3 and 4

| Batch | Additive | Load ($10^3$kg) | Compression strength. (kN/mm$^2$) | Mean strength (kN/mm$^2$) |
|---|---|---|---|---|
| A | None | 5.0 | 11.41 | 10.57 |
| A |  | 4.6 | 10.49 |  |
| A |  | 4.3 | 9.81 |  |
| 3 | 2 weight % | 5.0 | 11.41 | 11.79 |
| 3 | Bentonite/SB | 5.2 | 11.86 |  |
| 3 | (1:1) | 5.3 | 12.09 |  |
| 4 | 2 weight % | 5.3 | 12.09 | 12.17 |
| 4 | Bentonite/SB/DPR | 5.5 | 12.55 |  |
| 4 | (1:1:0.3) | 5.2 | 11.86 |  |

Example 4

Compression Test of a further Ceramic

Further ceramic test samples were prepared according to the method of Example 3 Batch 5 contained 2 weight % of a 1:1 weight ratio mixture of bentonite/spent bed material, and Batch 6 contained 4 weight % of a 1:1 weight ratio mixture of bentonite/spent bed material. A comparative Batch B of test samples was also prepared containing no additive. Each batch was baked at 1020° C. for a maximum of 60 minutes. The compression strength of each batch was tested, and the results are given in Table 5.

TABLE 5

Compression strength data from Batches B, 5 and 6

| Batch | Additive | Load ($10^3$kg) | Compression strength. (kN/mm$^2$) | Mean strength (kN/mm$^2$) |
|---|---|---|---|---|
| B | None | 3.5 | 7.98 | 7.30 |
| B | | 3.4 | 7.76 | |
| B | | 2.7 | 6.16 | |
| 5 | 2 weight % | 3.7 | 8.44 | 8.90 |
| 5 | Bentonite/SB | 3.7 | 8.44 | |
| 5 | (1:1) | 4.3 | 9.81 | |
| 6 | 4 weight % | 3.0 | 6.84 | 8.59 |
| 6 | Bentonite/SB | 4.5 | 10.26 | |
| 6 | (1:1) | 3.8 | 8.67 | |

Example 5

Water Absorption of a Ceramic

Ceramic test samples were prepared according to the method of Example 4, Batch 7 containing 2 weight % of a 1:1 weight ratio mixture of bentonite/spent bed material, Batch 8 containing 4 weight % of a 1:1 weight ratio mixture of bentonite/spent bed material and Batch 9 containing 4 weight % of spent bed material alone. A comparative Batch C of test samples was also prepared containing no additive. All the batches were produced in duplicate. The baking temperature for all test samples was 1020° C. The test samples were immersed in water, with their mass before and after immersion being recorded. The results for the duplicate batches (referred to as (a) and (b)) are given in Table 6.

TABLE 6

Water absorption data from Batches C and 7-9 ((a) and (b))

| Batch | Additive | Dry mass (g) | Wet mass (g) | Difference (g) | Water Absorbed (%) |
|---|---|---|---|---|---|
| C(a) | None | 374 | 430 | 56 | 14.97 |
| C(b) | None | 366 | 414 | 48 | 13.11 |
| 7(a) | 2 weight % Bentonite/SB (1:1) | 357 | 410 | 53 | 14.85 |
| 7(b) | As above | 404 | 452 | 48 | 11.88 |
| 8(a) | 4 weight % Bentonite/SB (1:1) | 349 | 399 | 50 | 14.33 |
| 8(b) | As above | 383 | 428 | 45 | 11.75 |
| 9(a) | 4 weight % SB | 383 | 434 | 51 | 13.32 |
| 9(b) | As above | 459 | 519 | 60 | 13.07 |

Example 6

Efflorescence of a Ceramic

A 3:7 mixture of ball clay/spent bed material (ball clay ex WBB & Co plc, Devon, UK) was prepared as described in Example 1. 3 weight % of this additive mixture was added to three different clays to form Batches 10, 11 and 12 of ceramic test samples. Comparative Batches D-10, D-11 and D-12 of ceramic test samples not containing any additive were prepared from each clay. The samples were baked at 970 or 1040° C. The efflorescence of each test sample was measured by partially submerging the test sample in water. The water was allowed to saturate the test sample, and as it evaporated from the exposed area of the test sample, salts were left concentrated on the exposed surfaces. Efflorescence was measured qualitatively by observing the amount of salts on the test sample exposed surfaces. "Very little" effloresence means white spots containing water insoluble salts are just detectable on the surface; "Little" efflorescence means up to 2% of the surface area is covered with white spots; "Medium" efflorescence means between 2 and 10% of the surface area is covered; "Strong" efflorescence means greater than 10% of the surface area is covered. The results are given in Table 8.

TABLE 8

Efflorescence data from Batches of D and 10-12

| Batch | 3 weight % ball clay/SB (3:7 mix) added | Baking Temp. (° C.) | Efflorescence |
|---|---|---|---|
| D-10 | — | 970 | None |
| 10 | Yes | 970 | None |
| D-10 | — | 1040 | Little |
| 10 | Yes | 1040 | None |
| D-11 | — | 970 | Little |
| 11 | Yes | 970 | Very Little |
| D-11 | — | 1040 | Strong |
| 11 | Yes | 1040 | Little |
| D-12 | — | 970 | Little |
| 12 | Yes | 970 | None |
| D-12 | — | 1040 | Little |
| 12 | Yes | 1040 | None |

Example 7

Compression Test on Masonry Bricks

The following batches of masonry bricks were formed by mixing a variety of additives into a bentonite-based proprietary clay containing from 18 to 22 weight % water. Batch 13 contained 1.8 weight % of spent bed material and 0.2 weight % of boric acid; Batch 14 contained 1 weight % of a 1:1 weight ratio mixture of bentonite/spent bed material; Batch 15 contained 2 weight % of a 1:1 weight ratio mixture of bentonite/spent bed material; Batch 16 contained 2 weight % of a 1:1:0.3 weight ratio mixture of bentonite/spent bed material/DPR gel; Batch 17 contained 1.8 weight % of spent bed material and 0.2 weight % sodium borate. A comparative Batch E was also prepared containing no additives. Batches 13-15 were baked at 930° C. and Batches 16-18 and E were baked at 970° C. for a maximum of 60 minutes. The compression strength of each batch was tested, and the results are given in Table 9. The surface area over which the load was applied in the compression test was 43 cm$^2$ in each case.

TABLE 9

Compression strength data from Batches E and 13-18

| Batch | Additive | Load (10³kg) | Compression strength (kN/mm²) | Mean strength (kN/mm²) |
|---|---|---|---|---|
| E | None | 5.0 | 11.41 | 10.57 |
| E |  | 4.6 | 10.49 |  |
| E |  | 4.3 | 9.81 |  |
| 13 | 1.8 weight % SB | 5.2 | 11.86 | 11.94 |
| 13 | 0.2 weight % boric | 5.2 | 11.86 |  |
| 13 | acid | 5.3 | 12.09 |  |
| 14 | 1 weight % | 4.2 | 9.58 | 10.42 |
| 14 | Bentonite/SB | 5.0 | 11.41 |  |
| 14 | (1:1) | 4.5 | 10.26 |  |
| 15 | 2 weight % | 5.0 | 11.41 | 11.79 |
| 15 | Bentonite/SB | 5.2 | 11.86 |  |
| 15 | (1:1) | 5.3 | 12.09 |  |
| 16 | 2 weight % | 5.3 | 12.09 | 12.17 |
| 16 | bentonite/SB/DPR | 5.6 | 15.55 |  |
| 16 | (1:1:0.3) | 5.2 | 11.86 |  |
| 17 | 1.8 weight % SB | 5.2 | 11.86 | 11.86 |
| 17 | 0.2 weight % Na | 5.2 | 11.86 |  |
| 17 | borate | 5.2 | 11.86 |  |

Example 8

Efflorescence from Cladding Bricks

The following batches of cladding bricks were formed by mixing a variety of additives into three different proprietary clay; Clays 1, 2 and 3. Clay 1 was a very plastic clay and had relatively high levels of sodium sulphate, calcium sulphate and pyrite. The high concentration of these various salts meant that bricks produced from this clay had a high tendency to effloresce. The type and amount of additives added to the clays are detailed in Table 10 below. The brick samples were baked at 1030° C. (Basic and Hanson Clays) or 970° C. (Proprietary Mix Clay). The efflorescence of each test sample was measured by submerging a third of the volume of the sample brick in distilled water for one week. The sample brick was then dried and its surface checked for efflorescence. The results are presented in Table 10. "Very little" effloresence means white spots containing water insoluble salts are just detectable on the surface; "Little" efflorescence means up to 2% of the surface area is covered with white spots; "Medium" efflorescence means between 2 and 10% of the surface area is covered; "Strong" efflorescence means greater than 10% of the surface area is covered.

TABLE 10

Efflorescence data from three difference clays

| Clay | Additives | Efflorescence characteristics |
|---|---|---|
| 1 | None | Medium |
| 1 | 0.2 weight % boric acid 1.8 weight % spent bed mat. | Very little |
| 2 | None | Very strong |
| 2 | 0.2 weight % boric acid 1.6 weight % spent bed mat. | Strong |
| 3 | None | Medium |
| 3 | 0.2 weight % boric acid 1.8 weight % spent bed mat. | Very little |
| 3 | 0.3 weight % boric acid 2.7 weight % spent bed mat. | Very little |

The invention claimed is:

1. A clay composition comprising spent bed material resulting from synthesis of organohalosilanes and halosilanes and at least 10 wt % of clay.

2. A clay composition according to claim 1, in which the clay is present in an amount of at least 20 wt % of the clay composition.

3. A clay composition according to claim 1, in which the clay and spent bed material are present in a weight ratio of from 3:1 to 1:3.

4. A clay composition according to claim 1, in which water is present in an amount of from 10 to 40 wt % of the clay composition.

5. A clay composition according to claim 1, in which the clay is selected from Fuller's Earth, bentonite, kaolin (China clay) and diatomite.

6. A clay composition according to claim 1, which further comprises direct process residue gel resulting from neutralisation and dewatering of higher boiling point halosilanes produced by direct process reaction of silicon and methyl chloride.

7. A clay composition according to claim 2, in which the clay and spent bed material are present in a weight ratio of from 3:1 to 1:3.

8. A clay composition according to claim 2, in which water is present in an amount of from 10 to 40 wt % of the clay composition.

9. A clay composition according to claim 3, in which water is present in an amount of from 10 to 40 wt % of the clay composition.

10. A clay composition according to claim 7, in which water is present in an amount of from 10 to 40 wt % of the clay composition.

11. A clay composition according to claim 2, in which the clay is selected from Fuller's Earth, bentonite, kaolin (China clay) and diatomite.

12. A clay composition according to claim 3, in which the clay is selected from Fuller's Earth, bentonite, kaolin (China clay) and diatomite.

13. A clay composition according to claim 4, in which the clay is selected from Fuller's Earth, bentonite, kaolin (China clay) and diatomite.

14. A clay composition according to claim 2, which further comprises direct process residue gel resulting from neutralisation and dewatering of higher boiling point halosilanes produced by direct process reaction of silicon and methyl chloride.

15. A clay composition according to claim 3, which further comprises direct process residue gel resulting from neutralisation and dewatering of higher boiling point halosilanes produced by direct process reaction of silicon and methyl chloride.

16. A clay composition according to claim 4, which further comprises direct process residue gel resulting from neutralisation and dewatering of higher boiling point halosilanes produced by direct process reaction of silicon and methyl chloride.

17. A clay composition according to claim 5, which further comprises direct process residue gel resulting from neutralisation and dewatering of higher boiling point halosilanes produced by direct process reaction of silicon and methyl chloride.

* * * * *